Sept. 18, 1923.  
O. GERHARDT  
METHOD OF AND SYSTEM FOR DETERMINING FROM AN AIRCRAFT THE ELEVATION ABOVE THE GROUND  
Filed Sept. 3, 1921  
1,468,018  
2 Sheets-Sheet 1
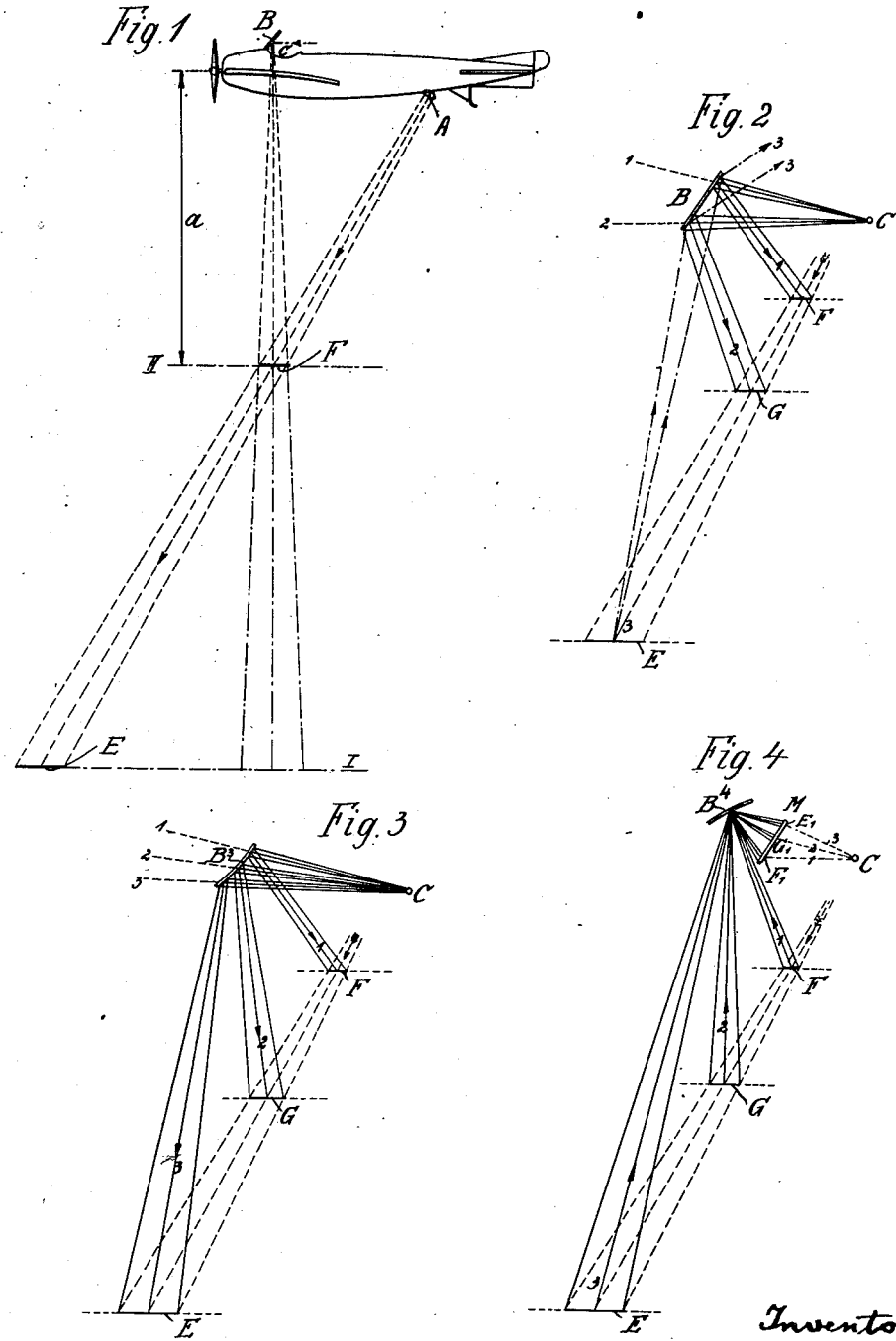

Sept. 18, 1923.  1,468,018
O. GERHARDT
METHOD OF AND SYSTEM FOR DETERMINING FROM AN AIRCRAFT THE ELEVATION
ABOVE THE GROUND
Filed Sept. 3, 1921　　　2 Sheets-Sheet 2
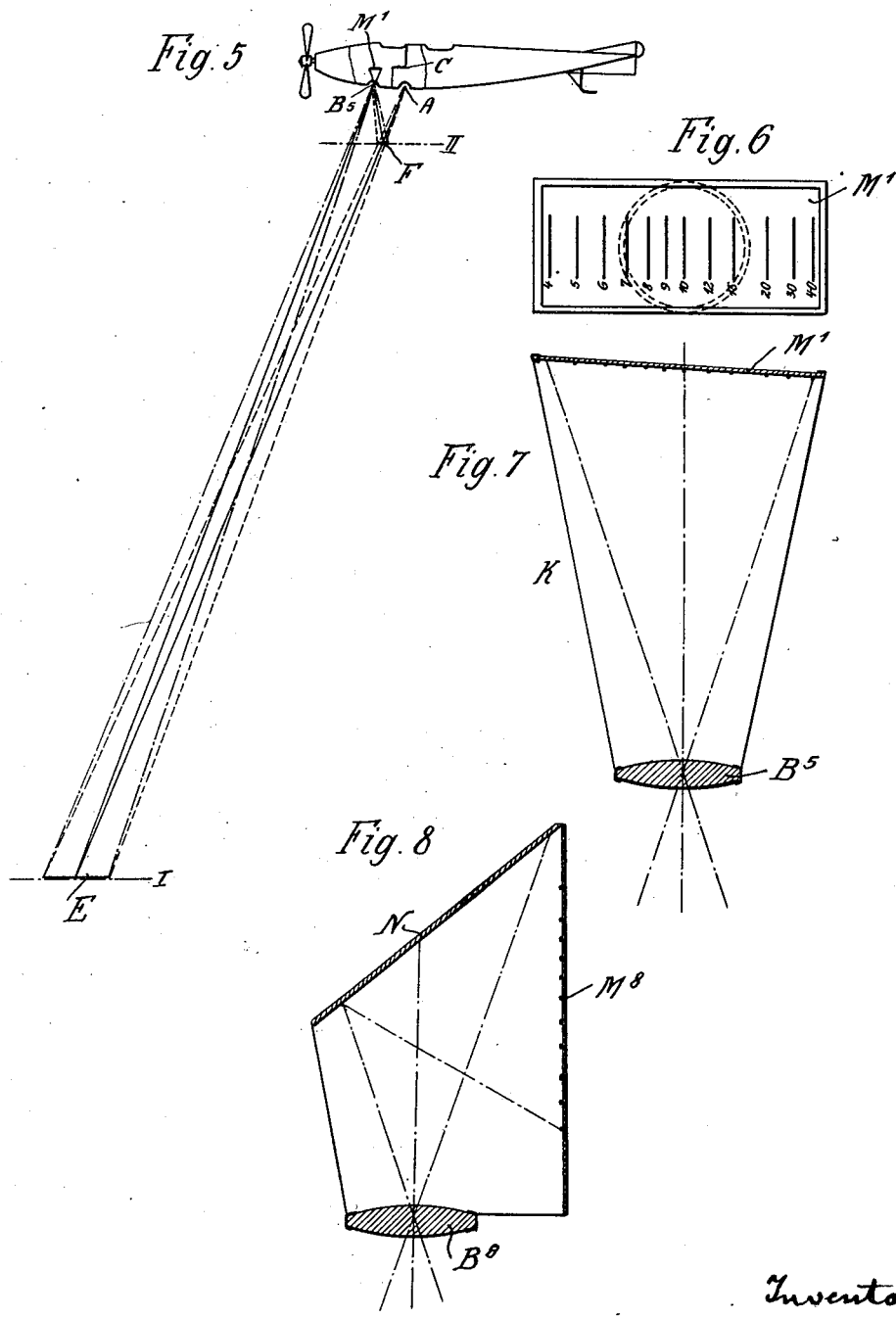

Patented Sept. 18, 1923.

1,468,018

UNITED STATES PATENT OFFICE.

OSCAR GERHARDT, OF BERLIN-LICHTERFELDE, GERMANY.

METHOD OF AND SYSTEM FOR DETERMINING FROM AN AIRCRAFT THE ELEVATION ABOVE THE GROUND.

Application filed September 3, 1921. Serial No. 498,457.

(GRANTED UNDER THE PROVISIONS OF THE ACT OF MARCH 3, 1921, 41 STAT. L., 1313.)

*To all whom it may concern:*

Be it known that I, OSCAR GERHARDT, a citizen of Germany, residing at Berlin-Lichterfelde, Germany, have invented certain new and useful Improvements in the Method of and System for Determining from an Aircraft the Elevation Above the Ground (for which I have filed applications in Germany, Serial Number G.44488/42c, 20, filed October 8, 1916, Patent Nr. 301325, granted July 17, 1917, and Serial Number G.44864/42c, 20, filed February 17, 1917, Patent Nr. 301326, granted July 17, 1917); and I do hereby declare the following to be a full, clear, and exact description of the invention, such as will enable others skilled in the art to which it appertains to make and use the same.

My invention relates to improvements in the method of and system for determining from an air craft the elevation above the ground, and one of the objects of the improvements is to enable the aeronaut at night and with a high degree of accuracy to determine the elevation of the air craft above the ground, which will assist him for example in landing. With this object in view my improved method consists in throwing a stream of light from a suitable point of the air craft on the ground, and ascertaining the elevation as a function of the angle included between the said stream of light and a line connecting the illuminated spot on the ground and a point of the air craft located a suitable distance away from the source of light.

For the purpose of explaining the invention several examples embodying the same have been shown in the accompanying drawings, in which the same reference characters have been used in all the views to indicate corresponding parts. In said drawings,—

Fig. 1 shows a system in which the light from the illuminated spot and thrown in a definite direction is used for determining the elevation.

Fig. 2 shows a system in which streams of light emitted from the spot at different angles are observed for determining the elevation, said streams being reflected by a plane mirror.

Fig. 3 shows a modification of the system shown in Fig. 2 in which the streams are reflected by a convex mirror.

Fig. 4 shows a further modification in which a real image of the spot is produced by means of a concave mirror on a transparent plate.

Fig. 5 shows a further modification in which the real image is produced by means of a converging lens.

Fig. 6 shows the transparent plate on an enlarged scale.

Fig. 7 is a side view of the lens and the translucent plate, and

Fig. 8 shows a modification in which the rays from the lens are thrown on a vertical translucent plate.

As shown in Fig. 1, at the bottom of the air craft a source of light comprising a parabolic reflector A is provided throwing a slightly diverging stream of light downwards and preferably forwards. In front of the seat C of the aeronaut a mirror B is disposed at a certain angle to the line of sight of the aeronaut. In the example shown in the figure the dimensions are such that the spot F on the ground illuminated by the source of light A is observed when the air craft is at distance $a$ from the ground represented by the line II. If the air craft is at a greater height, for example when the surface of the ground corresponds to the line I, the illuminated spot is at E, so that it can not be seen by the aeronaut looking at the mirror B in the same direction as before. Therefore, if the spot is visible in the mirror, the aeronaut knows, that he is at a certain height.

In the modification shown in Fig. 2 the aeronaut can observe the mirror B at different angles represented by the lines 1 and 2. The figure shows that the spot can be observed when it is in any of the positions located between F and G, while the spot can not be observed when it is in the position E. The part of the mirror B which reflects the light from the spot indicates the elevation.

In the modification shown in Fig. 3 a convex mirror B³ is used, whereby the field of observation is increased, so that also the spot E can be observed. The light from spot F is reflected along the line 1, that from the spot G along the line 2, and that from the spot E along the line 3. By providing a sighting device in front of the mirror B⁸ the lines 1, 2, and 3 and therefore the elevation of the air craft above the ground can be observed.

In Fig. 4 I have shown a modification in which a real image of the spot is produced on a plate M of translucent glass. As shown, a concave mirror B⁴ is used for producing the image. The spots E, F, and G appear on the glass plate at E¹, F¹, and G¹. Therefore, as the air craft rises, the image travels on the plate M from F¹ to E¹. The image produced on the plate M has always substantially the same size, because the reduction of the size caused by the increase of the distance of the spot on the ground is nearly balanced by the increase of the size of the spot illuminated on the ground. A desirable feature of the system shown in Fig. 4 is that at smaller elevations of the air craft the path of the image on the plate M is relatively large, which results in a high accuracy of the observations in case of a flight near the ground. Preferably graduation marks are provided on the plate M for indicating the exact height of the air craft. The translucent plate provided between the mirror B⁴ and the eye of the aeronaut prevents blinding of the aeronaut by a sudden flash of light.

In Fig. 5 I have shown a modification in which a convex lens B⁵ is provided for producing a real image of the illuminated spot on the translucent glass plate M'. As shown the glass plate M' and the lens are disposed within the body of the air craft in order to avoid an increase of the resistance of the air. By providing a lens the opening at the bottom of the body is small as compared to a system in which a concave mirror is used. Figs. 6 and 7 show the lens and the glass plate on an enlarged scale. As shown the glass plate M' is provided with graduation marks indicating the height of the air craft above the ground. Preferably the lens and the glass plate are connected by a tubular casing K. As the distance of the lens B⁵ from the illuminated spot and therefore the distance of the lens from the image of the spot varies, I prefer to dispose the glass plate at an angle to the axis of the lens, so that a sharp image is produced on the plate.

In the system shown in Figs. 5 to 7 the aeronaut must direct his eyes downwards in order to ascertain the position of the image on the glass plate M'. In Fig. 8 I have shown a modification in which the plate M⁸ is disposed vertically and in front of the seat of the aeronaut who therefore is not obliged to turn his eyes away from the line of flight for ascertaining the elevation of the air craft. As shown the rays coming from the lens B⁸ are reflected by a mirror N on an upright translucent plate M⁸ disposed so that sharp images of the illuminated spots are formed thereon. As shown the upright plate is disposed vertically and parallelly to the axis of the lens B⁸. But in some cases I prefer to dispose it at a slight angle to the vertical line corresponding to the angular position of the glass plate M' shown in Fig. 7.

While in describing the invention reference has been made to particular examples embodying the same, I wish it to be understood that my invention is not limited to the constructions shown in the figures, and that various changes may be made in the general arrangement of the system and the construction of its parts without departing from the invention.

I claim:

1. The method of ascertaining the distance of a craft from the ground, which consists in throwing a single beam of light from a suitable point of the craft on the ground, and ascertaining the elevation as a function of the angle included between said beam of light and light reflected from the ground to a point on the craft located at a distance from the point from which said beam of light is emitted.

2. The method of ascertaining the distance of a craft from the ground, which consists in throwing a beam of light from a suitable point of the craft on the ground, and visually inspecting the spot thrown by said beam on the ground from a point on said craft away from said point from which the beam is thrown, and determining the elevation as a function of the angle included between the beam emanating from the craft and the direction in which said spot is inspected.

3. The method of ascertaining the elevation of an air craft above the ground, which consists in throwing a stream of light from a suitable point of the air craft on the ground, and producing an image of the spot illuminated on the ground by said stream of light by rays emanating from the spot at an angle to the stream of light.

4. A system for ascertaining the distance of a craft from the ground, comprising a single source of light located at a suitable part of the craft and adapted to throw a beam of light downwards, and means to ascertain the path of rays reflected from the spot illuminated on the ground by said source of light to a point away from said source of light.

5. A system for ascertaining the distance of a craft above the ground, comprising a source of light located at a suitable part of the craft and adapted to throw a beam of light downwards, and means disposed at a point on the craft away from said source of light for visually inspecting the luminous spot produced by said source on the ground, said means being constructed to indicate the elevation as a function of the angle between the beam of light emanating from said source of light and the direction of the light reflected from the ground, to said inspecting means.

6. A system for ascertaining the elevation of an air craft above the ground, comprising a source of light located at a suitable part of the air craft and adapted to throw a stream of light downwards, and means to produce an image of the spot illuminated by said stream of light on the ground by rays emanating from said spot at an angle to the stream of light.

7. A system for ascertaining the elevation of an air craft above the ground, comprising a source of light located at a suitable part of the air craft and adapted to throw a stream of light downwards, and means to converge the rays emanating from the spot illuminated on the ground by said source of light into a real image, and a surface adapted to make said image visible and so located relatively to the converging means that any image produced thereon is sharp.

8. A system for ascertaining the elevation of an air craft above the ground, comprising a source of light located at a suitable part of the air craft and adapted to throw a stream of light downwards, and a converging lens and a screen adapted to produce an image of the spot illuminated by said stream of light on the ground by rays emanating from said spot at an angle to the stream of light.

9. A system for ascertaining the elevation of an air craft above the ground, comprising a source of light located at a suitable part of the air craft and adapted to throw a stream of light downwards, a converging lens, an upright screen, and a mirror cooperating to produce an upright image of the spot illuminated by said stream of light on the ground by rays emanating from said spot at an angle to the stream of light.

In testimony whereof I hereunto affix my signature in the presence of two witnesses.

OSCAR GERHARDT.

Witnesses:
FRITZ DAMMANN,
PAUL ROLF.